(12) United States Patent
Gschwind

(10) Patent No.: US 6,192,466 B1
(45) Date of Patent: *Feb. 20, 2001

(54) PIPELINE CONTROL FOR HIGH-FREQUENCY PIPELINED DESIGNS

(75) Inventor: Michael K. Gschwind, Danbury, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/234,820

(22) Filed: Jan. 21, 1999

(51) Int. Cl.$^7$ ............................................. G06F 9/30
(52) U.S. Cl. ............................................. 712/214
(58) Field of Search ............................ 712/23, 207, 214, 712/216

(56) References Cited

U.S. PATENT DOCUMENTS

| | | | |
|---|---|---|---|
| H1291 | * 2/1994 | Hinton et al. | 395/800 |
| 5,075,844 | * 12/1991 | Jardine et al. | 712/218 |
| 5,185,872 | * 2/1993 | Arnold et al. | 712/217 |
| 5,572,690 | 11/1996 | Molnar et al. | 395/375 |
| 5,574,925 | 11/1996 | Paver | 395/800 |
| 5,600,848 | 2/1997 | Sproull et al. | 395/800 |
| 5,666,506 | * 9/1997 | Hesson et al. | 395/392 |
| 5,887,152 | * 3/1999 | Tran | 395/393 |
| 5,987,594 | * 11/1999 | Panwar et al. | 712/227 |
| 6,006,030 | * 12/1999 | Dockser | 712/227 |
| 6,009,506 | * 12/1999 | Jardine et al. | 712/23 |
| 6,052,775 | * 4/2000 | Panwar et al. | 712/215 |

OTHER PUBLICATIONS

Sproull et al., "The Counterflow Pipeline Processro Architecture," IEEE Design & Test of Computers, pp. 48–59, 1994.
Moudgill et al., "Register Renaming and Dynamic Speculation: an Alternatice Approach," IEEE, pp. 202–213, 1993.
Sutherland, "Micropipelines," Communications of the ACM, vol. 32, No. 6, pp. 720–738, Jun. 1989.
Woods et al., "AMULET 1: An Asynchronous ARM Microprocessor," IEEE Transactions on Computers, vol. 46, No. 4, pp. 385–398, Apr. 1997.
Richardson et al., "Fred: An Architecture for a Self–Timed Decoupled Computer," IEEE, pp. 60–68, 1996.
Richardson et al., "Precise Exception Handling for a Self–Timed Processor," IEEE, pp. 32–37, 1995.
Gschwind, Dissertation, "Hardware/Software Co–Evaluation of Instruction Sets," pp. 1–115, Apr. 1996.

* cited by examiner

Primary Examiner—David Y. Eng
(74) Attorney, Agent, or Firm—F. Chau & Associates, LLP

(57) ABSTRACT

A pipeline control system, in accordance with the present invention, includes a plurality of operation stages for processing instructions, the operation stages including at least one instruction issue stage wherein instructions wait to be issued. A mechanism for analyzing an issued instruction is included to determine if the issued instruction is successful without requiring stall cycles. If instructions cannot be completed successfully due to resource conflicts or exception conditions, they are aborted and reissued by the at least one instruction issue stage. A mechanism is also included for directly returning the aborted instructions to be reissued to the at least one instruction issue stage such that the instruction is reissued while the operational stages continue to process instructions. A method for pipeline control is included.

36 Claims, 12 Drawing Sheets

PIPELINE CONTROL FOR HIGH-FREQUENCY PIPELINED DESIGNS

BACKGROUND OF THE INVENTION

1. Field of the Invention

The present invention relates to management of pipelined processing to reduce the frequency impact of pipeline synchronization and, more particularly, to in-order and out-of-order pipelined processing.

2. Description of the Related Art

Contemporary high-performance processor designs rely on two aspects to improve performance, namely increasing the speed with which each instruction is processed, and processing multiple instructions (parallel processing) at the same time to process more instructions in a given time period.

Typically, improving one of these aspects results in a degradation of the other aspect, unless appropriate design choices are made. An example of this approach is that using more pipeline stages can increase the achievable frequency, but may not be accompanied by a sustained pipeline utilization, achieving less than the potential peak performance of the architecture.

As processing speed as measured in clock frequency of processor units increases, the synchronization of pipeline elements poses a limiting factor. This is because while speed of process technologies (the processing elements) increase, it is not accompanied by a similar improvement in signal transmission speed. Thus, the cost of transmitting control information from one part of the chip to another part increases relative to the cost of performing operations and is becoming a limiting factor in the achievable processor frequency.

A simple form of parallel processing is pipelining, wherein multiple operations in different stages of processing proceed through a sequence of operation elements.

Referring to FIG. 1, a typical processing pipeline is shown. The evaluation of the following expressions: t=a[i]−a[i−1]; i++; may be translated in the following sequence of machine instructions, for example for IBM Power PC™ architecture. In the following code fragment, it is assumed that the address of the array a is stored in a register r5, and that variable i and t are stored in registers r6 and r0, respectively.

| PowerPC ™ machine code: | |
|---|---|
| 1: slwi r1, r6, 2 | ; compute offset i*4 |
| 2: addi r3, r6, −1 | ; compute i-1 |
| 3: slwi r3, r3, 2 | ; compute offset (i-1)*4 |

| PowerPC ™ machine code: | |
|---|---|
| 4: lwzx r1, r5, r1 | ; load a[i] |
| 5: lwzx r3, r5, r3 | ; load a[i-1] |
| 6: addi r6, r6, 1 | ; i++ |
| 7: subfc r0, r3, r1 | ; compute t |
| 8: . . . | ; program continues |
| 9: . . . | |
| 10: . . . | |

The processing steps involved in processing each of these instructions are shown in the block/flow diagram, FIG. 1. An instruction to be executed by the processor waits to be executed in block 101. This may be performed using an instruction buffer, or some other indicator which tracks which instructions need to be executed, such as a program counter for an in-order processor. In block 103, the instruction is issued for execution. The instruction operates in one or more processing units (two processing units are represented by blocks 105 and 107), passing from one unit to the next until it is passed to a final processing block 109. In block 109, the operation commits its results to the machine state, typically by writing the results of a computation to a register file. In some implementations, some of the above described blocks include steps which may be re-arranged or occur multiple times, e.g., some parts of the machine state may be committed to earlier than other parts, e.g., by inserting a second commit stage 109 between blocks 105 and 107 if certain conditions are met.

In a non-pipelined architecture, the above processing may take 1 cycle for each of blocks 103, 105, 107 and 109, for a total of four cycles for the execution of each instruction.

Typically, execution of an instruction needs the operation in a sequence of distinct units, while most or all other units are idle. Thus when instruction 2 executes in unit 105, the processing elements for steps 103, 107, and 109 are idle.

Pipelining addresses this resource inefficiency by processing several instructions in parallel, where each instruction is in a different step of processing, e.g., when operation 2 is processed by unit for block 105, instruction 1 may be simultaneously processed by the unit implementing block 107, and unit 103 may be processing instruction number 3.

The procession of processing steps in a pipeline is usually visualized with a "pipeline diagram". The following Table 1 shows the processing of the previous program segment in the exemplary pipeline shown in FIG. 1. Presuming a traditional RISC (reduced instruction set computer) type processing pipeline, the blocks 101, 103, 105, 107 and 109 include instruction fetch (IF), instruction decode (ID) execution (EX), memory access (MEM), and register file writeback (WB), and are labeled accordingly in Table 1.

TABLE 1

Exemplary execution without stalls in a typical RISC pipeline.

| | Cycle Number | | | | | | | | | | | |
|---|---|---|---|---|---|---|---|---|---|---|---|---|
| Instr | 1 | 2 | 3 | 4 | 5 | 6 | 7 | 8 | 9 | 10 | 11 | 12 |
| slwi | IF | ID | EX | MEM | WB | | | | | | | |
| addi | | IF | ID | EX | MEM | WB | | | | | | |
| slwi | | | IF | ID | EX | MEM | WB | | | | | |

TABLE 1-continued

Exemplary execution without stalls in a typical RISC pipeline.

| Instr | \multicolumn{12}{c|}{Cycle Number} |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| lwzx |  |  |  | IF | ID | EX | MEM | WB |  |  |  |  |
| lwzx |  |  |  |  | IF | ID | EX | MEM | WB |  |  |  |
| addi |  |  |  |  |  | IF | ID | EX | MEM | WB |  |  |
| subfc |  |  |  |  |  |  | IF | ID | EX | MEM | WB |  |
| 8:... |  |  |  |  |  |  |  | IF | ID | EX | MEM | WB |
| 9:... |  |  |  |  |  |  |  |  | IF | ID | EX | MEM |
| 10:... |  |  |  |  |  |  |  |  |  | IF | ID | EX |

This diagram shows instructions in the pipeline at any given time by reading the column for an appropriate time point, and in what cycle each instruction is performed in a particular processing step. Pipeline diagrams and the functioning of pipelines are described in more detail in "Computer Architecture—A Quantitative Approach" by J. L. Hennessy and D. A. Patterson, 2nd edition, Morgan Kaufmann Publishers, 1996.

A fundamental property of a pipeline is that only one instruction can be processed by any given unit at any time, unless units are duplicated for a given step. It is the purpose of a pipeline control mechanism to enforce this property, by ensuring that instructions proceed only if the next processing unit is available, i.e., if it is empty or will be surrendered by the instruction currently being processed. There may be many reasons why an instruction may not surrender a processing unit, such as a long running operation which takes multiple cycles, an operation may be waiting for missing operands, a cache miss may have occurred which has to be serviced, and so forth.

If a processing unit for the next step will not become available, an instruction has to remain in its current processing unit, a process which is referred to as "stall". As a result it will not vacate its processing unit, and so the next instruction upstream which expects to receive the stalling instruction's processing unit will stall, and so forth. Enforcing these stalls is referred to as flow control, and is the main aim of the pipeline control unit.

An example of a stall operation is presented in the following pipeline diagram, Table 2, where the first load operation experiences a cache miss, and takes two cycles. As a result, subsequent operations are stalled for one cycle and resume later.

The mechanism generating the stall signal, and how each pipeline stage actually processes such signal is now described. It will first be discussed how a single execution pipeline stage in blocks 105 or 107 of FIG. 1 performs a stall operation, and how this is controlled by the pipeline control. It will then be discussed how the execution of instructions in blocks 105 or 107 is controlled by a pipeline control mechanism implemented according to FIG. 2.

Referring to FIG. 2, a single execution pipeline stage represented by one of blocks 105 or 107 of FIG. 1 for a pipeline according to the prior art in the implementation of microprocessors is shown. In block 151, the pipeline stage receives the instruction from the upstream pipeline stage, which may be either the issue stage of block 103, or another execution pipeline stage (block 105 or 107) in a pipeline with multiple execution stages. In block 153, the pipeline stage 105 or 107 operates on the instruction received from the upstream pipeline stage and evaluates whether any stall conditions are present. The stall conditions may be due to the unavailability of some resources, such as waiting for input registers to receive values in scoreboarded machines, unit busy, cache misses, or a stall condition in a downstream pipeline stage. In block 155, stall information is analyzed and if no stall condition was found during operation, operation continues with block 157 or block 156. In block 156, the pipeline stage evaluates a global control signal received from a central controller 121 (FIG. 3) or a downstream pipeline stage indicating whether any of the downstream pipeline stages have experienced a stall condition (FIG. 4). If so, this stage stalls in turn and goes to step 159. Otherwise processing continues with block 157. The global stall control signal received from the upstream pipeline stage (FIG. 4) or

TABLE 2

Exemplary execution with stalls in a typical RISC pipeline.

| Instr | \multicolumn{12}{c|}{Cycle Number} |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| slwi | IF | ID | EX | MEM | WB |  |  |  |  |  |  |  |
| addi |  | IF | ID | EX | MEM | WB |  |  |  |  |  |  |
| slwi |  |  | IF | ID | EX | MEM | WB |  |  |  |  |  |
| lwzx |  |  |  | IF | ID | EX | MEM | MEM | WB |  |  |  |
| lwzx |  |  |  |  | IF | ID | EX | stall | MEM | WB |  |  |
| addi |  |  |  |  |  | IF | ID | stall | EX | MEM | WB |  |
| subfc |  |  |  |  |  |  | IF | stall | ID | EX | MEM |  |
| 8:... |  |  |  |  |  |  |  |  | IF | ID | EX | WB |
| 9:... |  |  |  |  |  |  |  |  |  | IF | ID | ... |
| 10:... |  |  |  |  |  |  |  |  |  |  | IF | ... | the central controller 121 (FIG. 3) implies significant wire delay and degrades the performance of the processor. This introduces a bottleneck in the achievable processor frequency using the control mechanism present in prior art for high performance implementations.

In block 157, the instruction (along with any intermediate results) is passed to the next downstream pipeline stage 107 or 109 for further processing.

In block 159, a stall condition has been detected, and all upstream processor stages and/or the central controller are notified that a stall condition is present. In the next cycle, operation in this pipeline stage will continue on this instruction to try to complete the instruction (see 123 in FIG. 3).

Referring to FIG. 3, an implementation of prior art processors is shown. A central control unit 121, typically is connected by several control signals 123 to all pipeline stages or blocks 101, 103, 105, 107 and 109. Control information from a pipeline stage to the central controller 121 will indicate whether an instruction has completed a particular step and is ready to advance to the next processing step, and any information about abnormal or error conditions, which may cause a synchronous control flow transfer to an error handling routine (referred to as "exception handler" or "trap handler").

At least two problems are associated with this type of design:

control complexity: There are many different combinations of states that each pipeline stage 101–109 can be in, the controller has to consider all of these. This may make the controller complex, error-prone, and slow.

delay: The delay associated in moving status information from the pipeline states 101 to 109 to the central controller 121 and sending control information using control signals 123 are becoming a significant problem in high-speed processor designs.

Note that time for wire delay has to be allocated in every cycle, even if no stall situation occurs. This can have a dramatic impact on the speed achievable by a processor design.

Referring to FIG. 4, an alternative implementation is shown eliminating the centralized controller 121. This alternative implementation is described in M. Gschwind, "Hardware/Software Co-Evaluation of Instruction Sets", PhD dissertation, TU Wien, Vienna, Austria, 1996.

In this implementation, the centralized controller 121 is replaced with a model based on communicating state machines. This approach reduces the hardware complexity of the design, but does not address the delay associated with control logic.

A stall condition in pipeline stage 107 would be communicated using control signal 135 to stage 105, which would cause that pipeline stage to stall. This would trigger control information to be sent from stage 105 to 103, signaling a stall situation in 105, and in turn stall 103, and so forth. The net effect is, that information ripples through the pipeline from stage 107 to stage 101, incurring significant wire delay for communicating pipeline control flow information.

Time for this wire delay incurred by the maximum length of the ripple chain (in this case, from stage 109 to stage 101) has to be allocated in every cycle. The implementation uses a small centralized controller for signaling and handling exceptions.

Counterflow pipelines offer another alternative implementation of a processor pipeline without a central controller 121 and are described by Sutherland et al. in two patents, U.S. Pat. Nos. 5,600,848 and 5,572,690, which give a design methodology for designs without a central controller, based on a concept of counter-flow pipelines. Counterflow pipelines are similar in concept to the previously discussed distributed control mechanism of FIG. 4. In this model, information exchange is restricted to communication between adjacent pipeline stages. Unlike the previous control mechanism, this one does not require a global controller for exception management, but solves such problems by passing information upstream from a stage experiencing an exception to the issue stage.

While the approach is conceptually simple and appealing, there are performance penalties associated with this approach, having to do with ensuring that data and counterflow data remain synchronized, and to ensure that a processing element is available when an instruction is ready to proceed to the next step. While this design addresses the wire delay problem, it reduces the maximum throughput to half the processing speed, as described in Sutherland et al., "The Counterflow Pipeline Processor Architecture", IEEE Design and Test of Computers, pp. 48–59, Fall 1994. Counterflow pipelines are an extension of the micropipeline concept de scribed by Sutherland in "Micropipelines", Communications of the ACM, vol. 32, no. 6, pp. 720–738, June 1989.

Several asynchronous processor designs are based on the micropipeline processor concept referenced above. Unlike synchronous processor designs, these designs do not use a global processor clock to synchronize processor operation. This eliminates the need to allocate time for communication in each clock cycle, and communication time is only allocated when it is actually required. Again, like in counterflow pipelines, this situation arises when the pipeline is heavily used.

The AMULET processor described by Woods et al. in "AMULET1: An Asynchronous ARM Microprocessor", IEEE Transaction on Computers, vol. 46, no. 4, pp. 385–398, April 1997, is an asynchronous implementation of an in-order processor. The processor uses a scoreboard for determining operand availability as described in N. Paver, "Condition Detection in Asynchronous Pipelines", UK Patent No. 9114513, October 1991. Other resource availability requests are resolved using stalls which can propagate through the processor. Exception handling in this processor is performed using a scheme based on squashed operations after an exception has occurred using "color bits". These prevent any operations from committing until the exception handler starts to pass through the pipeline.

The Fred processor described by W. Richardson and E. Brunvand in "Fred: An Architecture for a Self-Timed Decoupled Computer", Second International Symposium in Asynchronous Circuits and Systems, pp. 60–68, IEEE Computer Society Press, 1996 implements an asynchronous out-of-order processor. Stalls and resource management are similar to the AMULET1 processor implementation, but the exception mechanism relies on maintaining a buffer of out-standing instructions which may raise exceptions in an issue buffer. When an instruction encounters an abnormal situation, it returns to the issue buffer and raises an exception. While present asynchronous designs offer solutions for handling exceptions without a central controller, flow control involves negotiation similar to that shown in FIG. 4.

Therefore, a need exists for a pipeline control mechanism which reduces the cost of pipeline control and synchronization. A further need exists for eliminating the overhead imposed by global control structures, and particularly the wire delay associated with the global control structures.

SUMMARY OF THE INVENTION

A pipeline control system, in accordance with the present invention, replaces stall operations with a method to abort operations which would normally incur a stall operation. Aborted instructions are specially marked, for example, by a bit or by a unique instruction identifier (tag). Aborted instructios are returned to the issue stage ("recirculated") and issued ("reissued") to re-attempt execution. Reissue in this context is any mechanism used to reintroduce an aborted computation into the processing element sequence constituting a pipeline. Instructions which incur an exception are treated similarly, but an additional marker is employed to identify these instructions. When an instruction marked with an exception marker reaches the issue stage, the issue stage does not reissue that instruction, but starts execution of the exception handler. Control flow operations such as branches may be treated similarly.

A pipeline control system, in accordance with the present invention, includes a plurality of operation stages for processing instructions, the operation stages including at least one instruction issue stage wherein instructions wait to be issued. Means for analyzing an issued instruction to determine if the issued instruction is to be aborted and reissued, and means for directly returning the aborted instructions to be reissued to the at least one instruction issue stage such that the instruction is reissued while the operational stages continue to process instructions are included.

Another pipeline control system includes a plurality of operation stages for processing instructions, the operation stages including at least one instruction issue stage wherein instructions wait to be issued. The system also includes means for issuing the instructions, means for analyzing the issued instructions to determine if the issued instructions are to be aborted including means for marking the aborted instruction as a candidate for reissue and means for directly returning the aborted instructions to the at least one instruction issue stage such that the aborted instructions are reissued while the operational stages continue to process instructions.

In alternate embodiments, the means for directly returning the issued instruction may include at least one registered buffer to account for wire delays. The means for analyzing may include instruction logic for determining if resources are available for processing the issued instruction. The means for analyzing an issued instruction to determine if the issued instruction is to be aborted and reissued may include instruction logic for determining if an exception condition has been raised for the issued instruction. The at least one instruction issue stage may include a prefetch unit which prefetches an exception handler for handling the exception condition. The pipeline control system may be implemented for in-order processors. A mechanism to enforce in-order behavior may be included. The mechanism may implement branch instructions. The pipeline control system may further include a logic circuit for blocking and unblocking state altering operations. The logic circuit preferably blocks operations when an exception is encountered for the issued instruction and unblocks operations when the instruction reissues successfully. The pipeline control system may be implemented for out-of-order processors. The pipeline control system further include an instruction fetch unit for fetching instructions, the instruction fetch unit preferably prefetches instructions along a predicted path while the aborted instructions are returned to the at least one instruction issue stage. The pipeline control system may further include a program counter for returning instructions to the at least one instruction issue stage by setting the program counter to addresses of the aborted instructions and addresses of exception handlers for exceptions raised. The means for marking may include a data bit added to each aborted instruction and/or exception.

A method for pipeline control for processors includes the steps of providing operation stages for processing instructions, the operation stages including at least one instruction issue stage wherein instructions wait to be issued, issuing instructions for execution, analyzing the issued instructions to determine if the issued instructions are to be aborted and reissued and directly returning the aborted instructions to be reissued to the at least one instruction issue stage such that the instruction is reissued while the operational stages continue to process instructions.

In other methods, the steps of determining if resources are available for processing the issued instruction and aborting the issued instruction if resources are unavailable are also included. The method may further include the steps of determining if an exception condition has been raised by the issued instruction, aborting the issued instruction, and executing an appropriate exception handler. The method may further include the step of prefetching an exception handler for handling the exception condition. The method may further include the step of blocking and unblocking state altering operations. The step of blocking operations may be performed when an exception is encountered for the issued instruction and the unblocking operations may be performed when the instruction reissues successfully. The method may further include the step of marking the aborted instructions as reissue candidates.

The method may further include the step of returning an instruction identifier for an aborted instruction to the at least one instruction issue stage to identify the aborted instruction to be reissued. The method may further include the steps of, when instructions are aborted due to lack of resources, returning resource availability information to the aborted instruction sent back to the at least one instruction issue stage and waiting the until the resources are available to reissue the aborted instructions. The method may include the step of marking the aborted instructions which have raised an exception.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
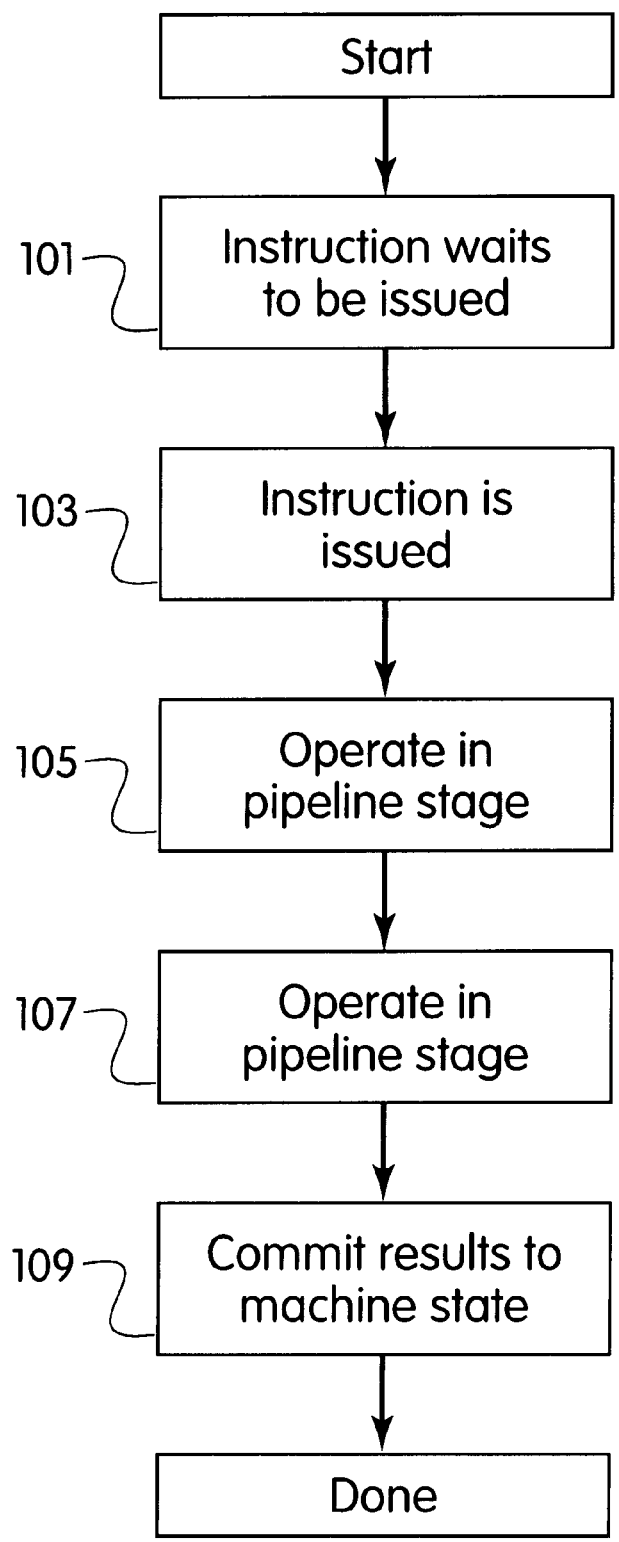
FIG. 1 is a block diagram of a pipeline system in accordance with the prior art.
Figure 2:
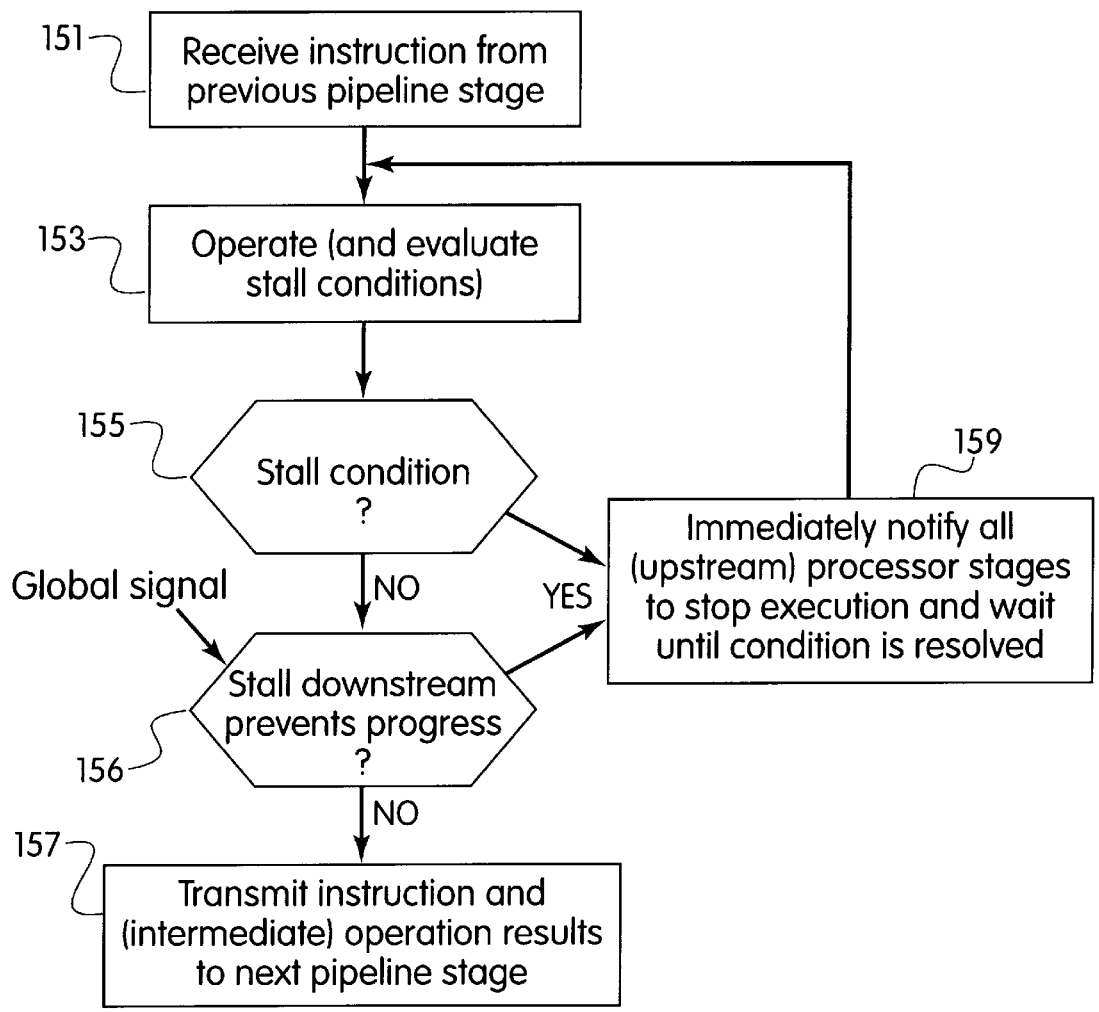
FIG. 2 is a block diagram of the pipeline system of FIG. 1 showing global stall control in accordance with the prior art.
Figure 3:
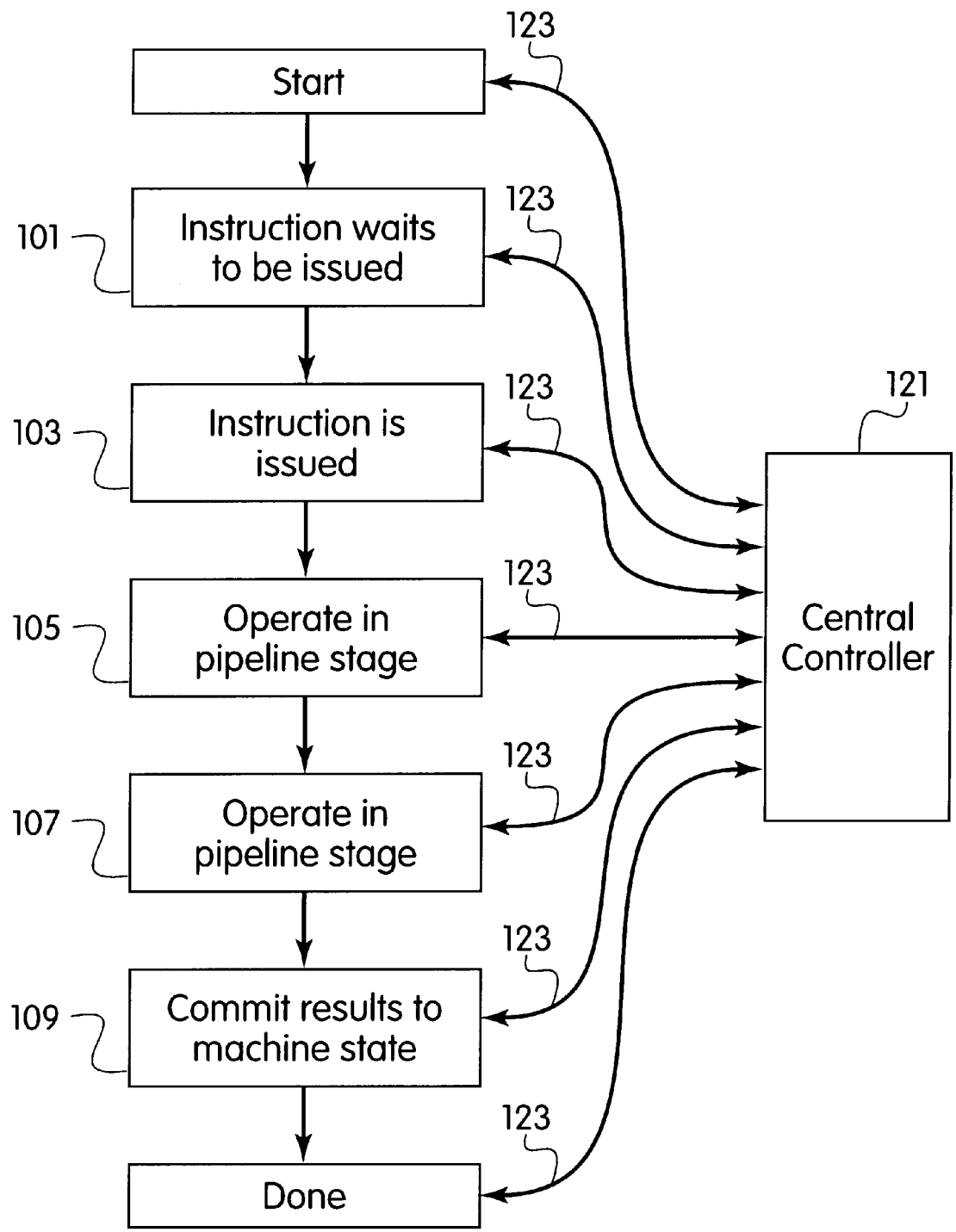
FIG. 3 is a block diagram of another pipeline system of having central controller in accordance with the prior art.
Figure 4:
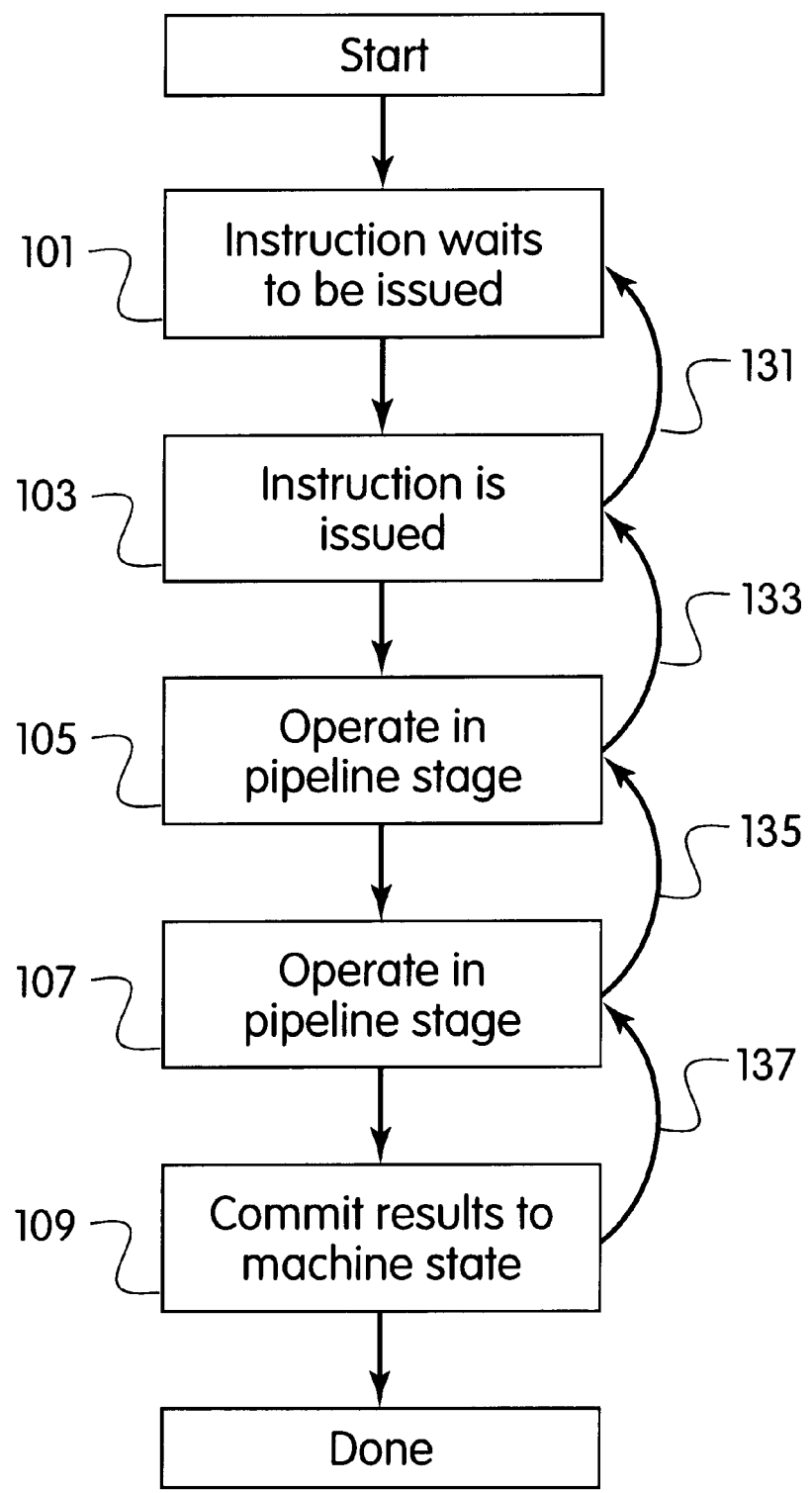
FIG. 4 is a block diagram of another pipeline system of having a distributed control mechanism in accordance with the prior art.

The present invention relates to management of pipelined processing to reduce the frequency impact of pipeline synchronization and, more particularly, to in-order and out-of-order pipelined processing. The present invention eliminates global communication in processor designs while maintaining peak performance. It does so by eliminating the stall wire delay. In addition, a global exception controller is eliminated, which normally communicates with all pipeline stages and incurs similar penalties.

The present invention restructures pipelines and flow control management in the pipeline. When an instruction is ready to proceed to the next processing step and the instruction finds resources which may be unavailable, the instruction will not remain in that processing element until the resources are available. Instead, the instruction execution is aborted and the instruction is marked. The aborted and marked instruction then proceeds to the at least one issue stage. Execution is then reattempted by reissuing the instruction on the assumption that resources have become available in the meantime. The present invention also integrates exception and stall handling in a single structure, so no separate mechanisms have to be maintained.

It should be understood that the elements shown in the FIGS. may be implemented in various forms of hardware, software or combinations thereof. Preferably, these elements are implemented in hardware on one or more appropriately programmed processors or memory chips having input/output interfaces. Referring now to the drawings in which like numerals represent the same or similar elements and initially to FIG. 5, a block/flow diagram for a pipeline is shown in accordance with the present invention. In block 201, an instruction waits to be issued. This may take the form of an instruction or issue buffer, or some other indicator which tracks which instructions need to be executed, such as a program counter PC for an in-order processor. In block 203, the instruction is issued to an execution pipeline. The instruction operates in several pipeline stages or blocks 205 and 207. In block 209, the instruction is analyzed as to whether the instruction needs to be returned to the issue stage to repeat the computation (due to the instruction being previously aborted). If the instruction needs to be reissued, by the issue stage to repeat the computation, processing continues with block 213. Otherwise, the instruction proceeds to block 211.

In block 211, the instruction commits its results to the machine state if it completed successfully. In block 213, the instruction is returned to the issue stage for reissue to repeat execution. Returning the aborted instruction may include returning the address of the aborted instruction, or a sequence number or any other unique instruction identifier. In the alternative, the actual instruction may be returned to the issue stage. In block 215, the instruction optionally travels one or more cycles to the issue buffer in block 201 to account for potential wire delay. This is preferably performed using staging buffers. When the instruction reaches block 201, it is again eligible for scheduling, and may either be scheduled immediately by block 203, or wait in an instruction buffer until it can issue.

Figure 5:
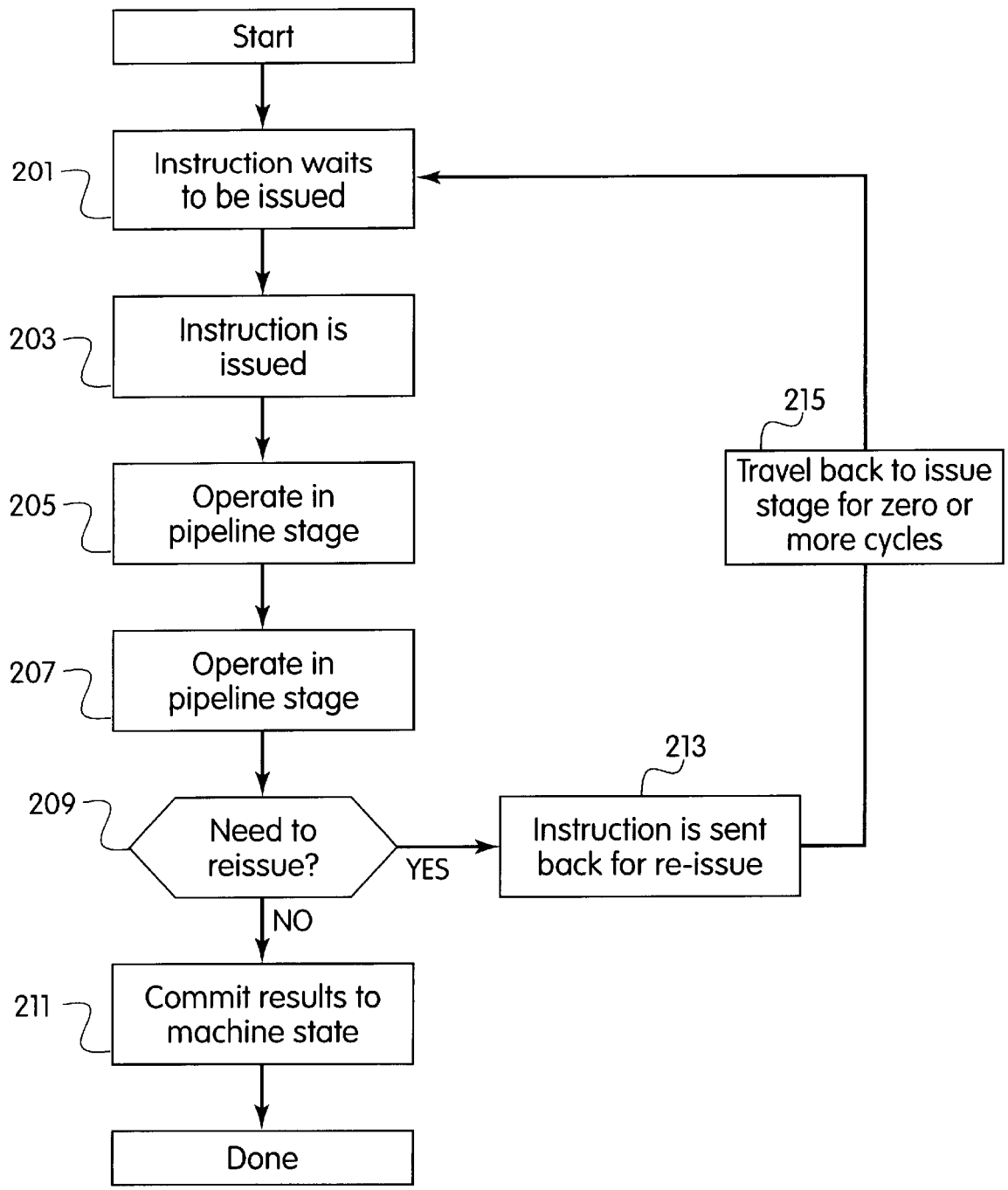
FIG. 5 is a flow/block diagram of a pipeline system implementing the present invention.
Figure 6:
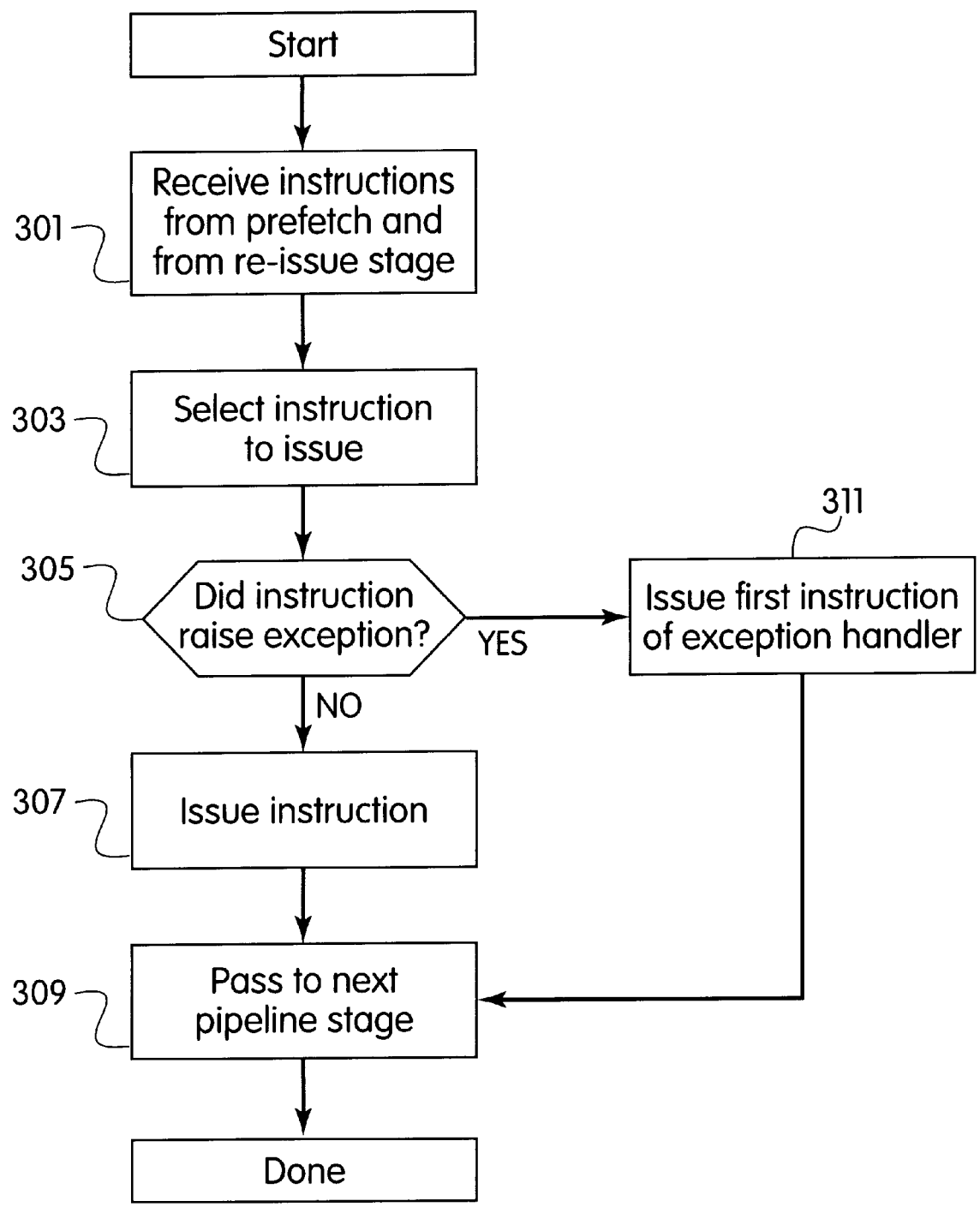
FIG. 6 is a flow/block diagram for issue logic for blocks 201 and 203 of FIG. 5 in accordance with the present invention.

Referring to FIG. 6, blocks 201 and 203 of FIG. 5 are depicted in greater detail. The instruction buffer and instruction dispatch logic according to the present invention are shown. In block 301, instructions are received from an instruction prefetch unit (or from an instruction cache if no prefetch unit is present, or from memory if not found in the instruction cache or if no instruction cache is present). Additionally, previously issued and aborted instructions may be received by the instruction buffer. In block 303, dispatch logic selects an instruction to be dispatched. In block 305, the instruction logic tests whether the instruction has previously raised an exception and has been re-circulated to the issue unit for further processing. If this is the case, processing continues with block 311. Otherwise, processing continues in block 307.

In block 307, the instruction is issued and passed to the next pipeline stage in block 309. In block 311, an instruction is detected which has already been issued previously but which has been recirculated by logic of block 209 of FIG. 5 because it was marked as having caused an exception condition. If this is the case, then the dispatch logic dispatches the first instruction of an exception handler. In one embodiment, when block 201 of FIG. 5 receives an instruction which has raised an exception, block 201 may immediately instruct the prefetch unit to start prefetching the concerned exception handler, thereby conserving additional time. In another embodiment, block 307 and/or block 311 may include a mechanism for in-order enforcement. Further details for in-order enforcement are described herein.

Figure 7:
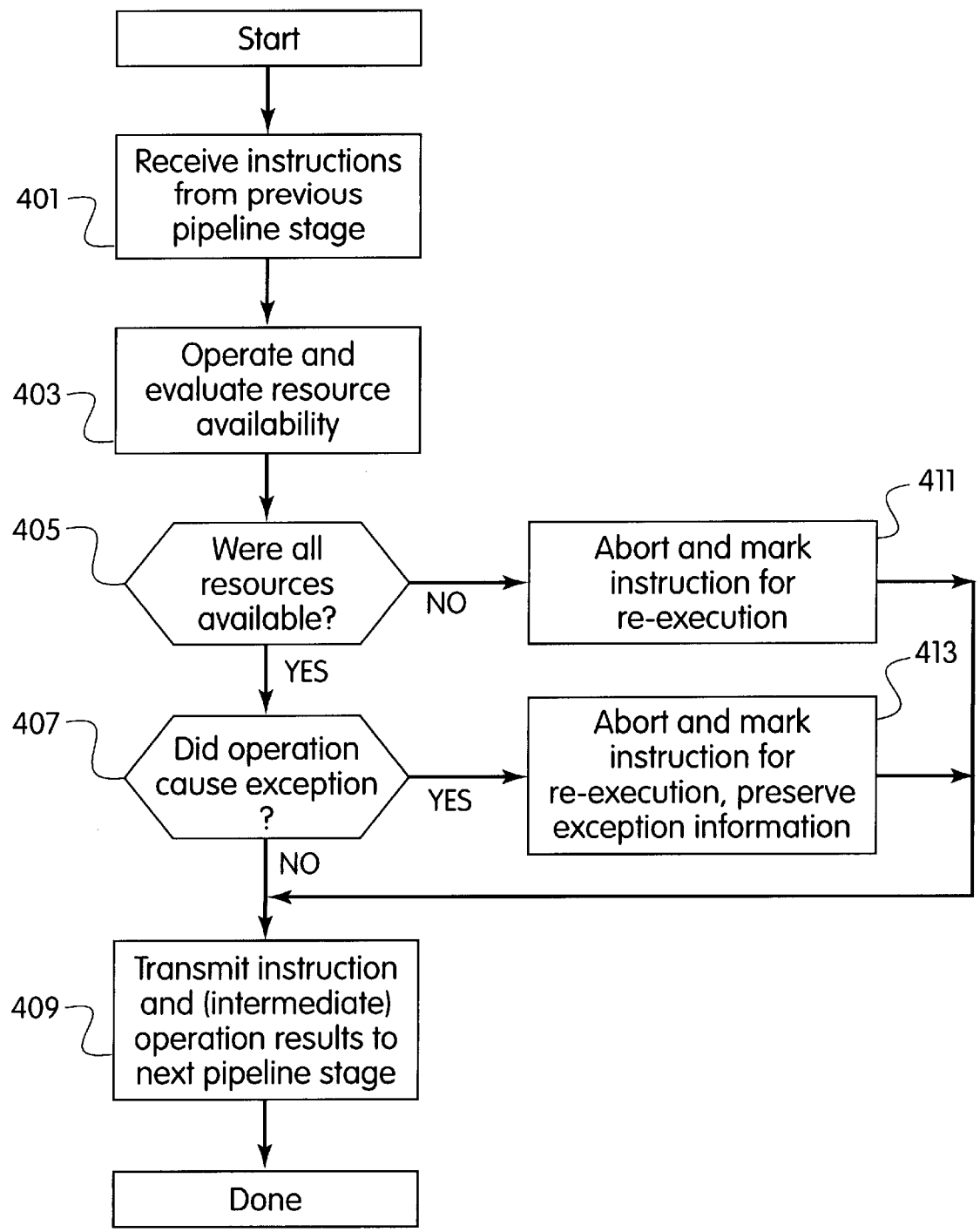
FIG. 7 is a flow/block diagram for execution stages for blocks 205 or 207 of FIG. 5 in accordance with the present invention.

Referring to FIG. 7, an execution pipeline stage shown as blocks 205 and/or 207 of FIG. 5 are shown in greater detail according to the present invention. In block 401, the instruction is received from a previous upstream pipeline stage for example from blocks 203 or 205 of FIG. 5. In block 403, the pipeline stages of blocks 205 or 207 of FIG. 5 operate on the instruction received from the upstream pipeline stage and evaluates whether all needed resources are present. In block 405, the availability information for the resources is analyzed. If resources were not available (such as waiting for input registers to receive values in machines with a scoreboarding mechanism, "unit busy", cache misses, etc.), processing proceeds with block 411. Otherwise, the processing continues with block 407. In block 407, exception information is evaluated. If the instruction caused an exceptional situation, processing continues with block 413. Otherwise, the next step includes block 409.

In block 409, the instruction is passed to the next pipeline stage downstream together with any (intermediate) results computed in this pipeline stage. In block 411, an instruction which cannot complete successfully due to any conditions detected by logic of block 405 is aborted and marked accordingly such that execution of this instruction will be retried. This will cause the decision of block 209 of FIG. 5 to recirculate the instruction to the at least one issue stage for future reissue by block 203. Processing continues with block 409 which passes the instruction, and the reissue information to the next pipeline stage downstream. In block 413, an instruction which has caused an exception condition is aborted and marked accordingly such that the appropriate exception handler will be executed. This will cause the decision of block 209 to recirculate the instruction for future reissue by block 203 as well. In addition, information is attached to the instruction marking it as having caused an exception, together with all information necessary to process such exception. Processing continues with block 409 which passes the instruction, the exception information, and the reissue information to the next pipeline stage downstream.

Many of the operations described above may be reordered. Different parts of the processing steps can be performed in parallel, or in a reversed order. Several processing steps can be performed in one pipeline stage, or one processing step distributed across several pipeline stages. Also, following the logic of the design, optimizations may be employed to further improve performance. Some examples follow.

Figure 8:
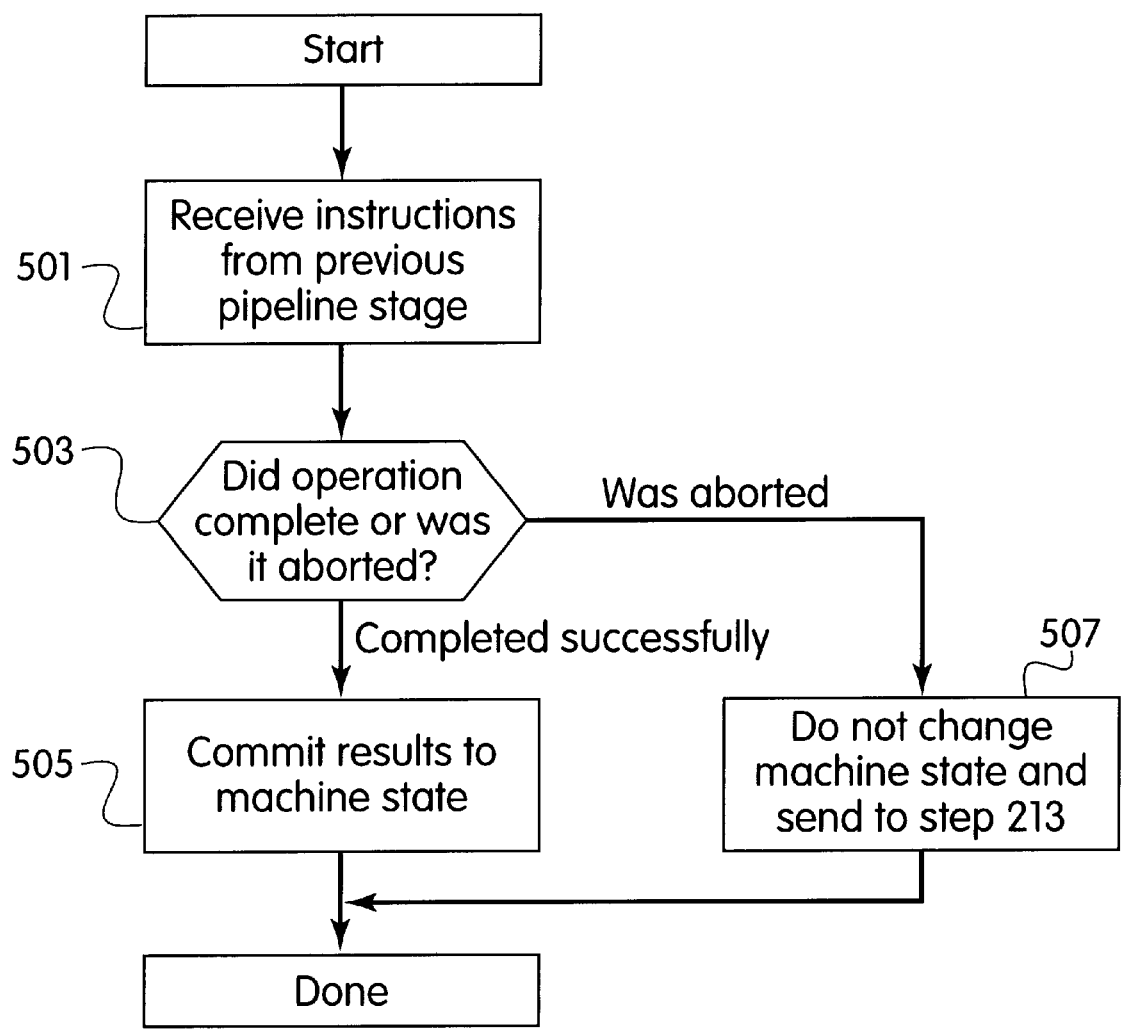
FIG. 8 is a flow/block diagram showing greater details for blocks 209 and 211 of FIG. 5 in accordance with the present invention.

Referring to FIG. 8, a commit stage of blocks 209 and 211 of FIG. 5 is shown according to the present invention. In block 501, the instruction is received from the previous upstream stage. In block 503, the instruction is tested to determine if the operation completed or if it was aborted. If execution of the current instruction was aborted, block 507 maintains the machine state unchanged and sends the instruction to block 213 of FIG. 5. In block 505, the results of the successfully completed instruction are committed to the machine state. Alternatively, the results computed by the operation may be added to a retirement queue, for example block 1026 of FIG. 12, in an out-of-order processor implementation.

Figure 9:
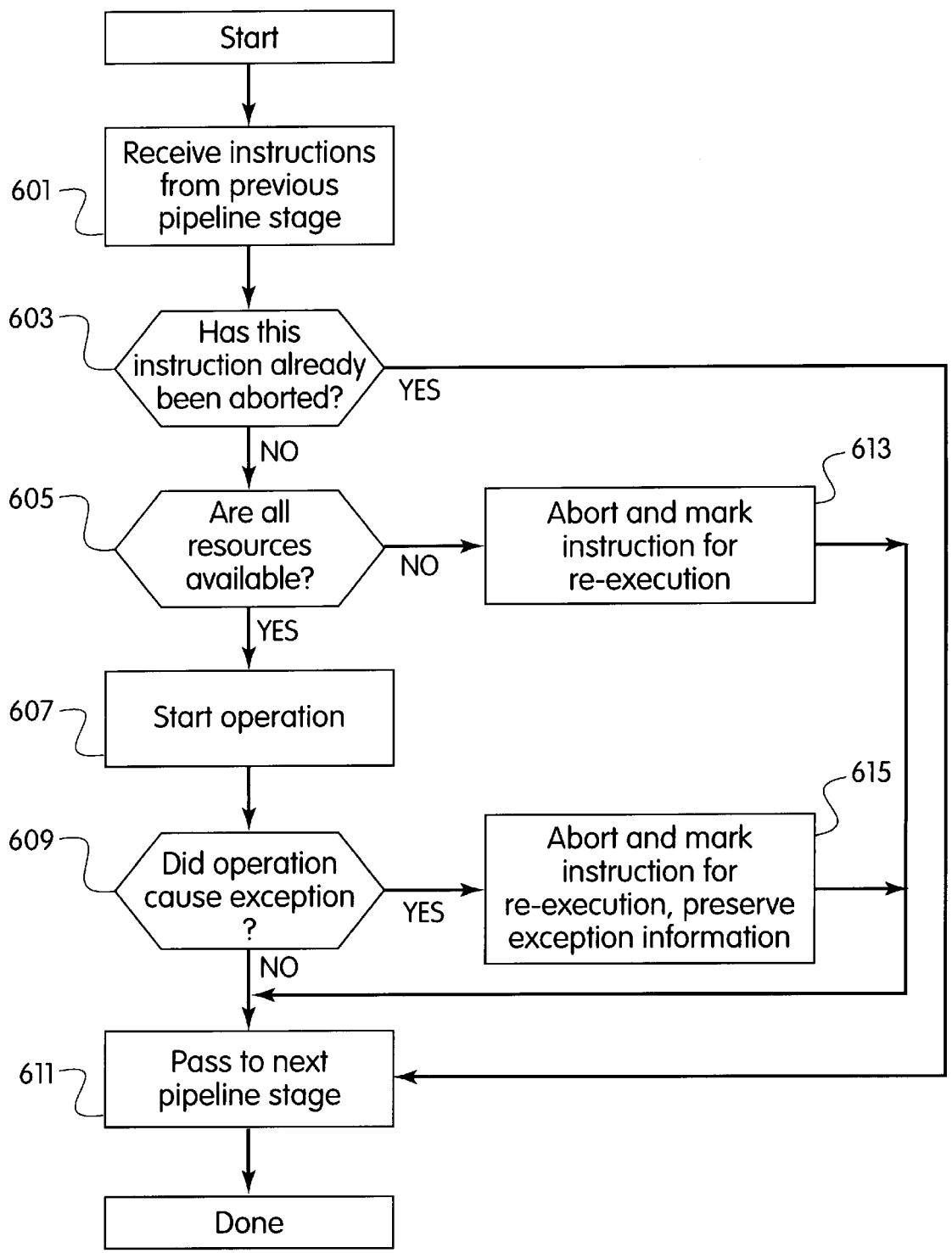
FIG. 9 is a flow/block diagram for optimized execution stages for blocks 205 or 207 of FIG. 5 in accordance with the present invention.

Referring to FIG. 9, an optimized pipeline stage for blocks 205 and/or 207 of FIG. 5 is shown. Before actual processing starts, the pipeline stage tests whether an instruction received in block 601 is already marked for recirculation and reissue. If this is the case, no further effort needs to be expended to actually operate on the instruction. Instead, it can be passed directly to block 611 for further transmission downstream. Otherwise, blocks 605 through 615 implement the same logic as described in FIG. 7.

Figure 11:
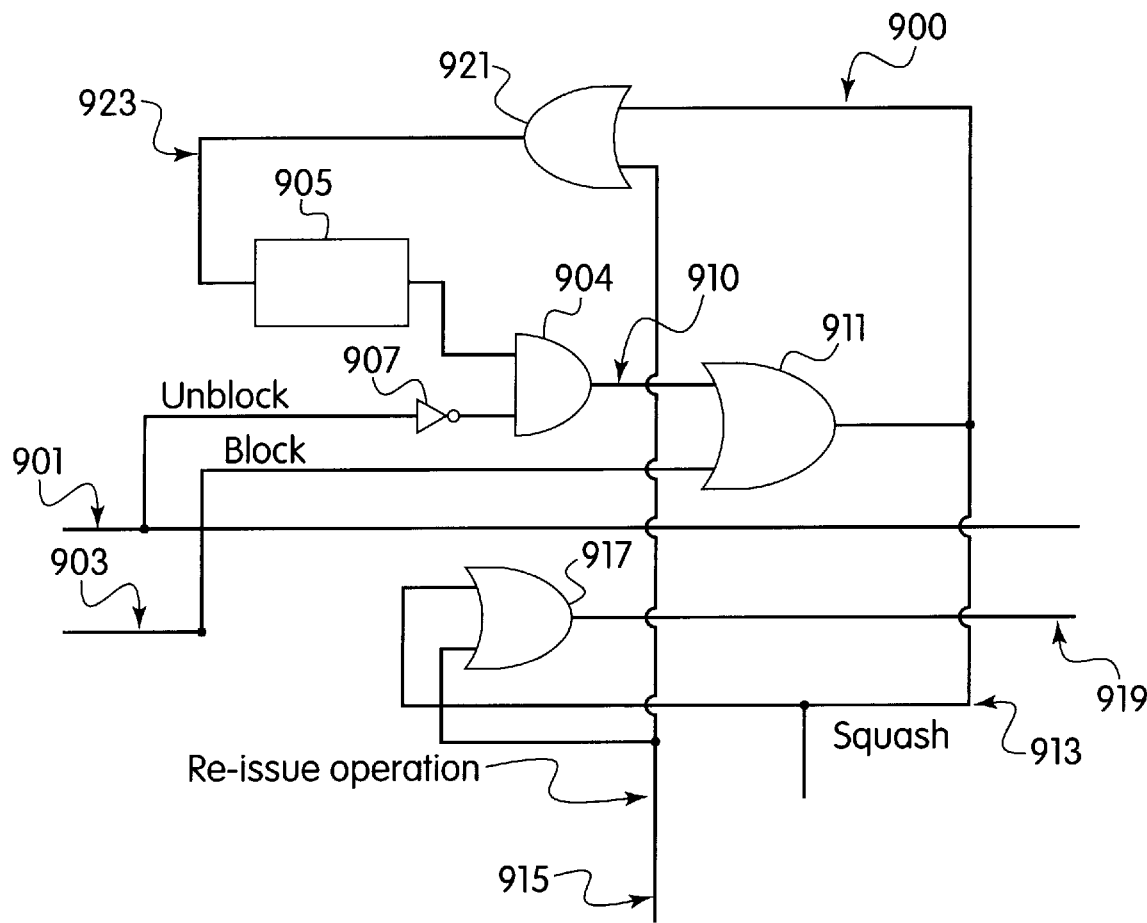
FIG. 11 is a schematic diagram for a logic circuit in accordance with the present invention for preserving in-order program execution processing for an in-order processor.

The present invention can be embodied in in-order or out-of-order processor designs. To this end, the present invention may be adapted to the specifications of these respective modes of operations for a processor. Depending on whether an in-order or an out-of-order instruction processor is implemented, the decision which instructions to abort and reissue is based thereon. To embody the invention in an in-order processor, a mechanism has to ensure that the in-order property is preserved by the processor. This may be achieved by aborting all instructions following an initially aborted instruction until such instruction has been reissued and completely successfully (FIG. 11). In an out-of-order embodiment, logic is already included in the processor to ensure in-order execution semantics through the provision of register renaming and an in-order retirement buffer.

In an in-order instruction processor with precise exceptions, when an instruction is aborted and reissued, all subsequent operations will also be aborted and reissued (in the original program order) until the original instruction completes. A mechanism to ensure that successor operations are aborted and reissued is preferred in this implementation scheme.

Figure 10:
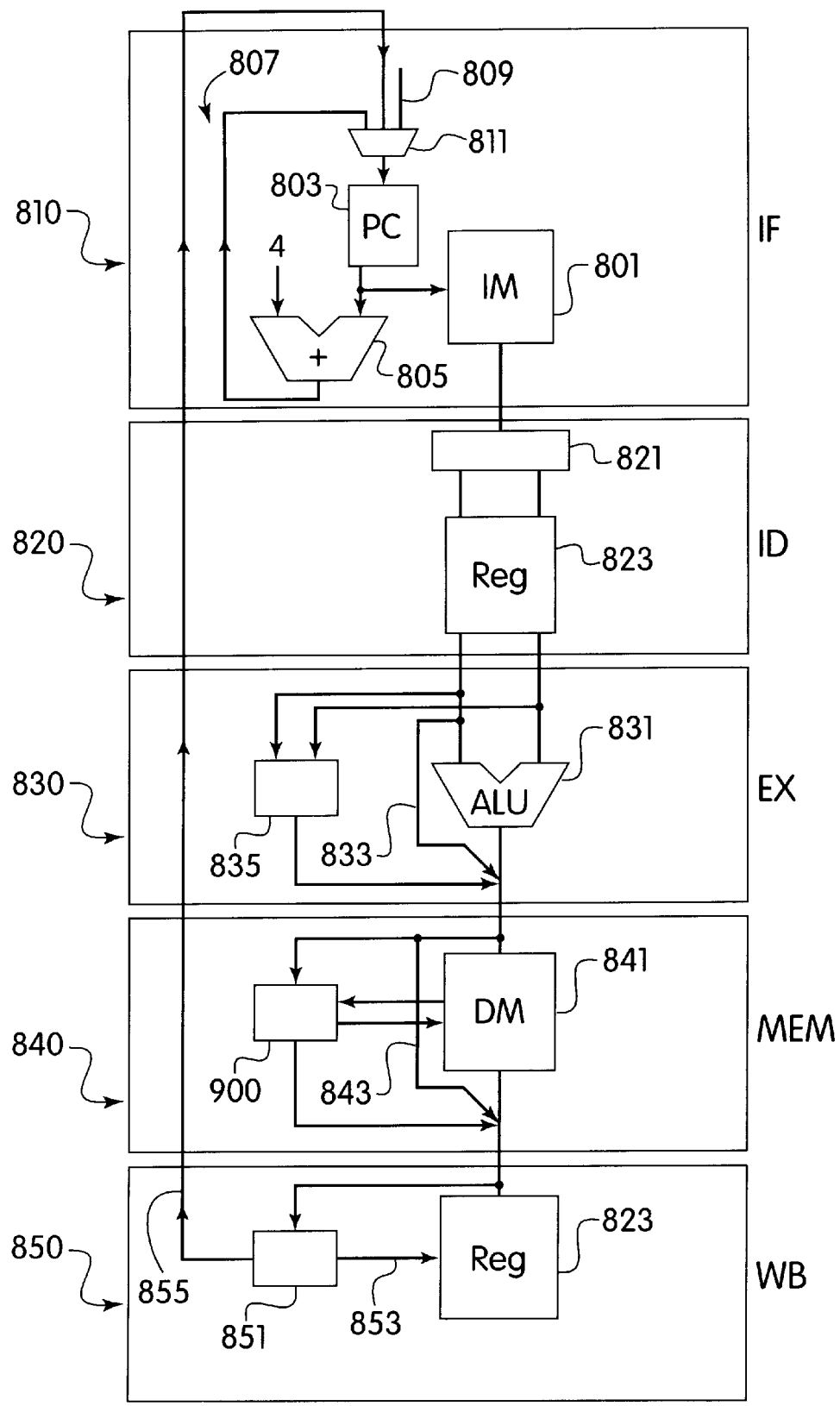
FIG. 10 is a block diagram for an in-order processor which employs the present invention.

Referring to FIG. 10, a simple pipelined in-order processor, based on the DLX design described in J. L. Hennessy and D. A. Patterson, "Computer Architecture—A Quantitative Approach", 2nd edition, Morgan Kaufmann Publishers, San Francisco, 1996, is depicted for use in accordance with the present invention. The processor includes 5 pipeline stages performing instruction fetch (IF) 810, instruction decoding and register file access (ID) 820, execution of ALU operations (EX) 830, access of data memory (MEM) 840 and writeback of result to the register file (WB) 850, respectively.

The instruction fetch stage IF 810 fetches instructions from an instruction memory 801. The address of an instruction word to be loaded from instruction memory 801 is specified by a program counter 803 (labeled PC). Simultaneously, the value of the program counter 803 is incremented by the length of the instruction word (4 bytes in the case of the exemplary DLX processor) in an address adder 805, and passed to a multiplexer 811. Multiplexer 811 may either select the incremented value of the program counter input 807 or an alternate input 809 to store in the program counter 803. The alternate input 809 allows the program counter 803 to be explicitly loaded with an address to implement branches or start the exception processing function. The address selected by multiplexer 811 will be stored in the program counter register 803 and used to prefetch the next instruction.

In the instruction decode stage ID 820, the instruction word is decoded by decoding logic 821, and a register file 823 is accessed to read the input operands of the operation. In the execution stage 830, the arithmetic and logic function unit 831 (labeled ALU) operates on the input operands, or can be bypassed by means of a bypass 833 if no processing is needed.

In data memory access stage MEM 840, the data memory 841 is accessed for memory operations. Other operations bypass this step by means of a bypass 843. In the write back stage (WB) 850, the results are written back to the register file 823 for use as input operands in further processing steps.

In addition to the components above, in-order pipelined processors may include other components such as forwarding units to make processing results available to subsequent operations before they are written to register file 823, branch history tables to predict the outcome of branches, and other performance enhancement features, without any modification to the basic processing structure.

In a pipelined processor, control flow operations, such as branches and exception handling exhibit special synchronization requirements, to ensure that no operations are executed beyond the instruction which causes the control flow change (i.e., the branch or the instruction which raises an exception). In typical in-order processors, this is achieved by a central controller 121 which enforces precise in-order operation by annulling operations sequentially following a control flow operation until the target of the control transfer has been fetched by instruction fetch logic 810.

According to the present invention, an in-order pipelined processor employing the features of the DLX design described in J. L. Hennessy and D. A. Patterson is illustratively employed to describe the present invention for pipeline control. The present invention advantageously employs the features and devices described below.

In block 835, a mechanism for analyzing instructions to determine whether or the not the instructions may be completed successfully without requiring a stall condition is included (see also block 405 and 407 of FIG. 7). Block 835 further provides a mechanism which aborts instructions which cannot be completed successfully without a stall condition. This abort mechanism marks the aborted instruction accordingly. To abort an instruction, committing an operation's result to the machine state may be suppressed, or the operation indicated by the instruction is prevented (see also blocks 411 and 413 of FIG. 7).

In block 851, a mechanism to analyze which instructions have been aborted and need to be re-executed is provided. (see also block 503 of FIG. 8). A signal 855 is provided to notify the issue stage when an instruction should be re-executed (see also blocks 213 and 215 of FIG. 5). Also, signal 855 includes a mechanism to initiate re-execution of aborted instructions, e.g., by setting program counter 803 to the address of the aborted instruction (or the exception handler for instructions aborted due to exceptions). Signal 853 enables and disables changes to the machine state maintained in register file 823 (see also block 505 of FIG. 8). In block 900, a mechanism is provided to preserve in-order execution behavior by annulling and aborting all instructions following an aborted instruction until that operation has completed successfully. These operations will be re-executed in-order.

For the present invention, instructions are analyzed, aborted and marked for re-execution in block 830 and 840 in a way described with reference to FIG. 7. Aborted instructions are recirculated for reissue by block 850 in a way described with reference to FIG. 8.

When an instruction is aborted by the previously described synchronization mechanism, the instruction may be reissued in an in-order processor by setting the program counter register 803 to the address of the instruction, and continuing instruction fetch from that address. This is achievable by means of extending the multiplexer 811 to accept additional sources, for example, the address of an instruction to be reissued or the address of a trap handler function if the instruction has caused an exception.

Block 900 is needed to preserve the in-order processing property in a pipelined processor. In the absence of a central controller 121, this may be achieved by an invalidation circuit as depicted in FIG. 11.

Referring to FIG. 11, a logic circuit is shown for block 900 (shown in FIG. 10) which may be used in conjunction with the present invention to preserve the in-order execution property in an in-order processor embodiment of the present invention. This is achieved by blocking all changes to the processor's architected processor state once an instruction has encountered a problem, and only allowing changes to the processor state when that instruction reissues successfully.

Block 900 will now be referred to as circuit or logic circuit 900. Circuit 900 may be added to any stage having the following features:

1. All conditions which can cause an instruction to be marked for reissue have been detected before or in the stage to which circuit 900 is to be employed.
2. Changes to the machine state and main memory are committed in or after the stage to which circuit 900 is to be employed.

In the illustrative in-order processor of FIG. 10, the in-order logic circuit 900 may be added to stage 840 (MEM).

The logic in FIG. 11 is described in the context of squashing operations after an instruction is aborted, and before it has been reissued. Those skilled in the art will understand that this mechanism may also be used for exception and branch processing, by setting latch 905 to block state changes after a branch or excepting instruction, and unblock latch 905 by setting signal 901 for the instruction at the branch target, or for the first instruction of the exception handler.

Logic circuit 900 is based on a latch 905 which represents the results of the operation on previous instructions. If any of the previous instructions have been aborted and marked for reissue by the issue stage, this latch will squash or prevent any subsequent operation from altering the processor state through a signal 913 labeled SQUASH.

The state of latch 905 is combined with signals 901 and 903 representing information about the current instruction. Signal 901 will be set to a logic "1" for instructions which have been reissued (either as a result of stall condition, or the first instruction of an exception handler in the case of an exception). A logic NOT gate 907 and an AND gate 909 override the state of latch 905 for such instructions and generate an intermediate signal 910, allowing processing to proceed when they pass through the pipeline again.

A second logic signal 903 is associated with each instruction, indicating an instruction's abort status. This signal is combined by logic OR 911 with intermediate squash signal 910 to generate a signal 913 labeled SQUASH which indicates whether an instruction may change the architected processor state. If signal 913 is 1, the architected processor state may not be changed, if signal 913 includes a logic "0", the instruction proceeds normally. Logic circuit 900 is illustrative and non-limiting. Other circuits may be employed to serve the same or similar functions.

The result of reissue decision in blocks 411 and 413 of FIG. 7 (also blocks 613 and 615 of FIG. 9) is represented by signal 915 which is combined with the result of the previous blocking status (signal 913) by a logical OR 917 and transmitted by signal 919 to the next pipeline stage were it serves as input 903 for another copy of this circuit included within that processing step, or as input to decision 209 in FIG. 5, for example. (Where a logic "1" corresponds to the answer YES.)

In addition, signal 915 is also combined with SQUASH signal 913 by logic OR 921, resulting in a combined result 923 which summarizes the successful completion of all previous instructions (represented by the original contents of latch 905), combined with the completion success of the current instruction. The logic value of signal 923 is stored by latch 905 for the processing of the next instruction.

The following pipeline diagram demonstrates the effect of the present invention on the pipelines execution of the previously shown program fragment (Tables 1 and/or 2) when the first memory load operation (instruction no. 4) encounters a cache miss.

In the following Table 3, instructions which have been aborted and marked for re-execution are indicated with an asterisk.

TABLE 3

Exemplary execution according to present invention embodied in an in-order RISC pipeline

| | Cycle Number | | | | | | | | | | | | | |
|---|---|---|---|---|---|---|---|---|---|---|---|---|---|---|
| Instr | 1 | 2 | 3 | 4 | 5 | 6 | 7 | 8 | 9 | 10 | 11 | 12 | 13 | 14 |
| slwi | IF | ID | EX | MEM | WB | | | | | | | | | |
| addi | | IF | ID | EX | MEM | WB | | | | | | | | |
| slwi | | | IF | ID | EX | MEM | WB | | | | | | | |

TABLE 3-continued

Exemplary execution according to present invention
embodied in an in-order RISC pipeline

| Instr | Cycle Number | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| lwzx | | | | IF | ID | EX | MEM* | WB* | IF | ID | EX | MEM | WB | |
| lwzx | | | | | IF | ID | EX | MEM* | WB* | IF | ID | EX | MEM | WB |
| addi | | | | | | IF | ID | EX | MEM* | WB* | IF | ID | EX | MEM |
| subfc | | | | | | | IF | ID | EX | MEM* | WB* | IF | ID | EX |
| 8:... | | | | | | | | IF | ID | EX | MEM* | WB* | IF | ID |
| 9:... | | | | | | | | | | | | | | IF |
| 10:... | | | | | | | | | | | | | | |

The order of instructions issued by the issue (dispatch) unit for the exemplary in-order embodiment of the present invention shown in Table 3 is as follows: 1, 2, 3, 4, 5, 6, 7, 8, 4, 5, 6, 7, 8, 9, 10. Note that although no dependency or resource conflict would have prevented instructions 5, 6 and 8 to execute successfully, they were aborted by logic circuit 900 to preserve in-order execution behavior.

In Table 3, an aborted instruction may be refetched by instruction fetch logic 810 in the cycle immediately after it has reached the writeback (W3) stage.

The operation of logic circuit 900 will now be illustratively described with reference to FIGS. 10 and 11. The following issue sequence may be generated: (annotated with the value of latch 905, signals 901, 903 and 923 for a pipeline stage 840, where the reissue condition is first detected in an upstream pipeline stage 830).

| Instruction | | Latch 905 | Signal 901 | Signal 903 | Signal 923 |
|---|---|---|---|---|---|
| 1: slwi | | 0 | 0 | 0 | 0 |
| 2: addi | | 0 | 0 | 0 | 0 |
| 3: slwi | | 0 | 0 | 0 | 0 |
| 4: lwzx | -reissued | 0 | 0 | 1 | 1 |
| 5: lwzx | -reissued | 1 | 0 | 0 | 1 |
| 6: addi | -reissued | 1 | 0 | 0 | 1 |
| 7: subfc | -reissued | 1 | 0 | 0 | 1 |
| 8: ... | -reissued | 1 | 0 | 0 | 1 |
| 4: lwzx | | 1 | 1 | 0 | 0 |
| 5: lwzx | | 0 | 0 | 0 | 0 |
| 6: addi | | 0 | 0 | 0 | 0 |
| 7: subfc | | 0 | 0 | 0 | 0 |
| 8: ... | | 0 | 0 | 0 | 0 |
| 9: ... | | 0 | 0 | 0 | 0 |
| 10: ... | | 0 | 0 | 0 | 0 |

Here, the issue buffer has issued instructions after instruction 4, which need to be quashed and marked for reissue later in the pipeline stage, since there is no immediate communication (which is eliminated in accordance with the present invention) between the stage where the reissue condition is detected and the issue buffer. Because in-order property is to be preserved, all instructions after instruction 4 have to be recirculated.

To preserve strict "in-orderness" in this scheme, an instruction may only modify the processor state (including memory) in or after the pipeline stage which is the latest pipeline stage which can abort instructions and mark the instructions for recirculation.

While previous work has been able to guarantee the in-order property for pipeline processing, such as by using a color scheme as described for the AMULET1 processor (cited above), no integration of previous annul mechanisms was possible with actual pipeline control. In contrast, the present invention includes an approach which integrates preserving the in-order property on control flow change, with pipeline control logic to eliminate the cost of stall signal propagation.

An alternative embodiment may issue instructions to several units (in-order) at the same time, such is the case for superscaler in-order pipelined architectures, or for VLIW/EPIC (very long instruction word/explicitly parallel instruction computer) processors. In either case, the only modification needed is to the control structure shown in FIG. 10, to ensure that in-order behavior is preserved for multiple instructions. The extension of the present logic in FIG. 10 to multiple execution units is clear to those skilled in the art based on the present disclosure. Note that to avoid cycle time penalties, it may be necessary to structure the pipeline so as to allow additional communication overhead time between the multiple parallel execution pipelines.

Another embodiment of the present invention is implemented in an out-of-order superscalar processor capable of dynamically scheduling instructions. The out-of-order processor shown in FIG. 12 includes the following features:

1. A mechanism for issuing instructions out-of-order, including the ability to detect dependencies among the instructions, rename the registers used by an instruction, and detect the availability of the resources used by an instruction.
2. A mechanism for maintaining the out-of-order state of the processor, which reflects the effects of instructions as they are executed (out-of-order).
3. A mechanism for retiring instructions in program order, simultaneously updating the in-order state with the effects of the instruction being retired.
4. A mechanism for retiring an instruction in program order without updating the in-order state (effectively canceling the effects of the instruction being retired), and for resuming in-order execution of the program starting at the instruction being retired (which implies canceling all the effects present in the out-of-order state).

Mechanism 3 from the list above is used to retire instructions when the effects of the instruction being retired are correct. Mechanism 4 is used instead, whenever there is some abnormal condition resulting from the execution of the instruction being retired or from some external event.

Figure 12:
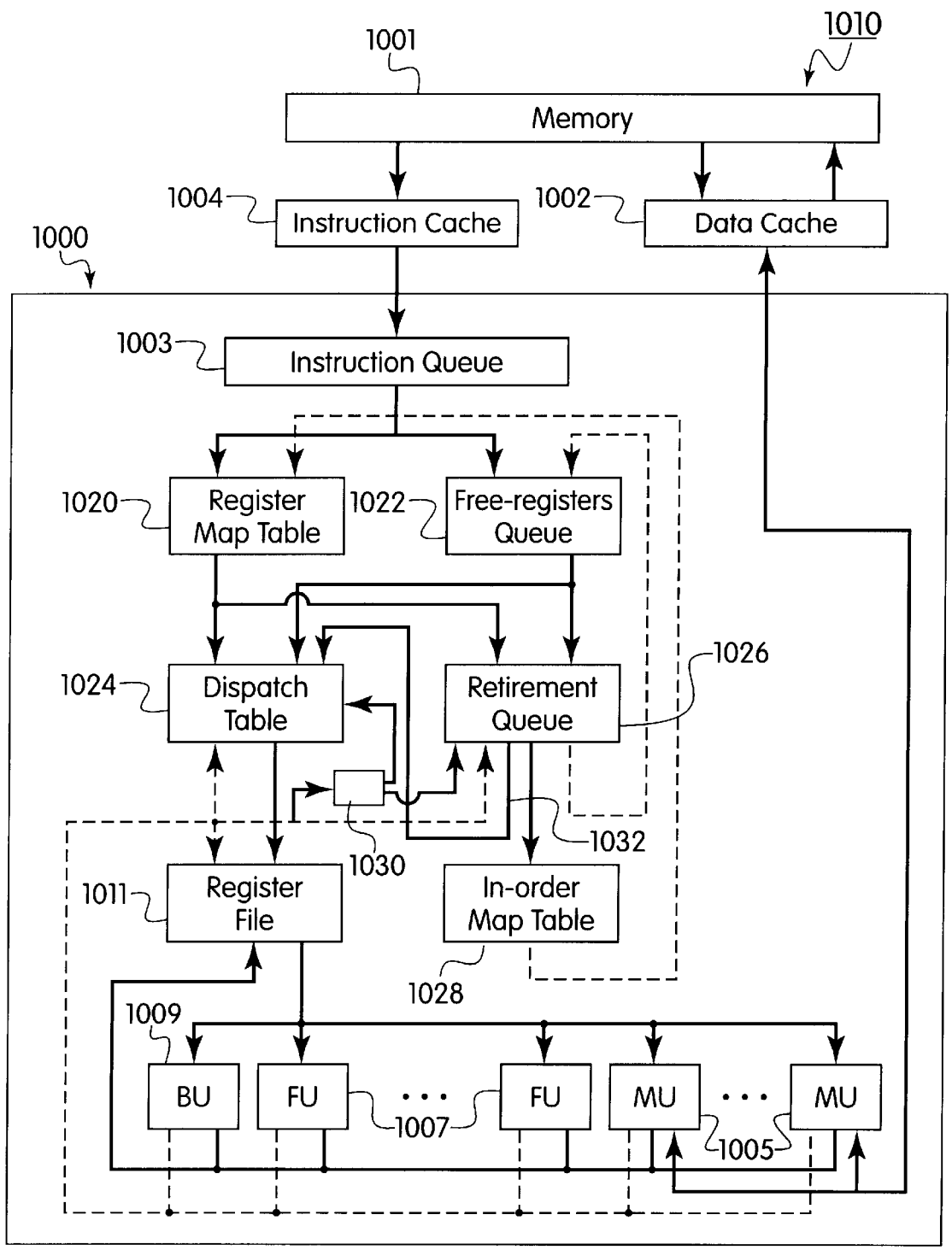
FIG. 12 is a block diagram for an out-of-order processor which employs the present invention

Referring to FIG. 12, a superscalar processor system 1010 is shown with hardware resources to support reordering of instructions using the mechanisms listed above. System 1010 includes a memory subsystem 1001, a data cache 1002, an instruction cache 1004, and a processor unit 1000. Processor unit 1000 includes an instruction queue 1003, several memory units 1005 (MU) that perform load and store operations, several functional units 1007 (FU) that perform integer, logic and floating-point operations, a branch unit 1009 (BU), a register file 1011, a register map table 1020, a free-registers queue 1022, a dispatch table 1024, a retirement queue 1026 and an in-order map table 1028. This exemplary organization is based on the one described by M. Moudgill, K. Pingali, S. Vassiliadis in "Register renaming and dynamic speculation: an alternative approach," in Proceedings of the 26th Annual International Symposium on Microarchitecture, pp. 202–213, December 1993.

In the processor depicted in FIG. 12, instructions are fetched from instruction cache 1004 (or memory subsystem 1001 if not in the instruction cache) under control of branch unit 1009, and are placed in the instruction queue 1003. Instructions are extracted from instruction queue 1003. The architected registers names used by the instructions for specifying the operands are renamed according to the contents of register map table 1020, which specifies the current mapping from architected register names to physical registers. The architected registers names used by the instructions for specifying the destinations for the results are assigned physical registers extracted from free-register queue 1007, which includes the names of physical registers not currently being used by processor 1000. Register map table 1020 is updated with the assignments of physical registers to the architected destination register names specified by the instructions. Instructions with all their registers renamed are placed in dispatch table 1024. Instructions are also placed in retirement queue 1026, in program order, including their addresses, their physical and their architected register names. Instructions are dispatched from dispatch table 1024 when all the resources used by the instructions are available (physical registers have been assigned the expected operands, and functional units are free). The operands used by the instruction are read from register file 1011, which may include general-purpose registers (GPRs), floating-point registers (FPRs), and Condition Registers (CRs). Instructions are executed, potentially out-of-order, in a corresponding memory unit 1005, functional unit 1007, or branch unit 1009. Upon completion of execution, the results from the instructions are placed in register file 1011. Instructions in dispatch table 1024 waiting from the physical registers set by the instructions completing execution are notified. Retirement queue 1026 is notified of the instructions completing execution, including whether they raised any exceptions. Completed instructions are removed from retirement queue 1026, in program order (from the head of the queue). At retirement time, if no exceptions were raised by an instruction, in-order map table 1028 is updated so that architected register names point to the physical registers in the register file 1011 including the results from the instruction being retired. The previous register names from in-order map table 1028 are returned to free-registers queue 1022. On the other hand, if an instruction has raised an exception, program control is set to the address of the instruction being retired from retirement queue 1026. Retirement queue 1026 is cleared (flushed), thus canceling all unretired instructions. Register map table 1020 is set to the contents of in-order map table 1028, and any register not in the in-order map table 1028 is added to the free-registers queue 1022.

In addition to the components above, superscaler processors may include other components such as branch-history tables to predict the outcome of branches.

According to the present invention, the superscalar processor 1010 employs the present invention for efficient flow control and includes a mechanism to abort an instruction and mark instructions accordingly. This mechanism may be included in at least one of blocks 1005, 1007 and/or 1009. Control logic 1030 and signal 1032 are also included to re-insert aborted instructions in the issue buffer (dispatch table) 1024, including sufficient information about the instruction so it can be reissued (register specifiers etc.). Control logic 1030 implements the function of block 503 of FIG. 8. Signal 1032 provides a means for returning an instruction (see blocks 213 and 215)

In a superscalar out-of-order processor according to the present invention, the retirement queue is notified of the instruction completing execution, including whether they need to be reissued to complete successfully, or whether they raised any exceptions. If an instruction needs to be reissued, that instruction is passed from retirement queue 1026 to dispatch table 1024, together with the physical register names referring to its input operands and retirement queue 1026 remains unmodified. If the instruction is completed successfully, or raised an exception, the instruction is added to retirement queue 1026 and processed at retirement time as previously described.

An optimized processor design may permit a unit to annotate instructions which have been aborted are reissue candidates with the expected time when they can be processed successfully. This serves as a "hint" to the issue logic.

Table 4 shows the execution of the exemplary code fragment with a cache miss during the first load instruction (instruction 4) in a superscalar out-of-order microprocessor employing the present invention for pipeline control. To simplify the following discussion it is assumed that the issue stage (also called dispatch stage in the design of superscalar processors) can only issue (dispatch) a single instruction in every cycle. The application to processors which support dispatch of multiple instructions in a single cycle would be apparent to those skilled in the art.

The pipeline stages used in the exemplary superscalar out-of-order processor design are: instruction fetch (IF), waiting in the instruction buffer (IB), instruction issue (also referred to as dispatch in superscalar out-of-order processor designs—DP), register fetch (RF), ALU execution (EX), memory access (MEM), retirement queue (RQ) and in-order commit (IOC). For simplicity, it is assumed that address generation in the memory access stage (MEM) is in the same cycle as actual memory access in the following example.

Unlike other pipeline stages, multiple instructions may be active in the instruction buffer (IB) and the retirement queue (RQ) at the same time. Also, in superscalar out-of-order designs instructions do not pass through all execution units as is usually the case in the design of typical in-order RISC pipelines.

In the following Table 4, instructions which have been aborted and marked for re-execution are indicated with an asterisk.

TABLE 4

Exemplary execution according to present invention embodied in an out-of-order processor pipeline

| | Cycle Number | | | | | | | | | | | | | |
|---|---|---|---|---|---|---|---|---|---|---|---|---|---|---|
| Instr | 1 | 2 | 3 | 4 | 5 | 6 | 7 | 8 | 9 | 10 | 11 | 12 | 13 | 14 |
| slwi | IF | DP | RF | EX | RQ | IOC | | | | | | | | |
| addi | | IF | DP | RF | EX | RQ | | IOC | | | | | | |

TABLE 4-continued

Exemplary execution according to present invention embodied in an out-of-order processor pipeline

| | Cycle Number | | | | | | | | | | | | | |
|---|---|---|---|---|---|---|---|---|---|---|---|---|---|---|
| Instr | 1 | 2 | 3 | 4 | 5 | 6 | 7 | 8 | 9 | 10 | 11 | 12 | 13 | 14 |
| slwi | | | IF | DP | RF | EX | RQ | IOC | | | | | | |
| lwzx | | | | IF | DP | RF | MEM* | RQ* | DP | RF | MEM | RQ | IOC | |
| lwzx | | | | | IF | DP | RF | MEM | RQ | RQ | RQ | RQ | IOC | |
| addi | | | | | | IF | DP | RF | EX | RQ | RQ | RQ | IOC | |
| subfc | | | | | | | IF | DP | RF* | EX* | RQ* | DP | RF | EX |
| 8:... | | | | | | | | IF | IB | DP | ... | | | |
| 9:... | | | | | | | | | IF | IB | DP | ... | | |
| 10:... | | | | | | | | | | IF | IB | IB | DP | IF |

The order of instructions issued by the issue (dispatch) unit for the exemplary out-of-order embodiment of the present invention is as follows: 1, 2, 3, 4, 5, 6, 7, 4, 8, 9, 7, 10. Here, only dependent instructions which cannot complete because input operands are missing are aborted and reissued.

In the out of order design, input operands are preserved for instructions which are subsequently aborted and reissued. In the design described in FIG. 12, a register renaming mechanism is provided by the architecture which may be used to satisfy this preservation. Alternative embodiments may make the values of the source operands available for reissued instructions by (1) stalling operations which may overwrite the inputs to operations which are in-flight, (2) carrying the operands with the instruction when it is aborted and recirculated to the instruction buffer (dispatch table), and/or (3) preserving the operands in the issue window (as used in the exception method described by Richardson and Brunvand, cited above).

There are a number of processor management areas for which abort and reissue of instructions may be used, for example, unavailability of input operands, handling of structural hazards, stalling instructions due to cache misses, etc. Not all of these control situations need to be solved based on this mechanism to employ the present invention. Scoreboarding may be employed for normal register dependencies, and instruction are issued appropriately. Situations where instructions are issued based on the assumption that data will be available for forwarding during later steps in processing may benefit from such an approach and be combined with a scoreboarded register file.

The present invention is applicable to any pipeline control system, including but not limited to microprocessors such as asynchronous and/or synchronous processors, which are illustratively described herein above.

Having described preferred embodiments of a pipeline control for high-frequency pipelined designs (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A pipeline control system comprising:
   a plurality of operation stages for processing instructions, the operation stages including at least one instruction issue stage including buffers wherein instructions wait to be issued;
   means for issuing the instructions;
   means for analyzing the issued instructions to determine if the issued instructions are to be aborted and reissued; and
   means for directly returning the aborted instructions to be reissued to the at least one instruction issue stage without communicating that instructions have been aborted to other stages of the plurality of operational stages such that the instructions are reissued by the means for issuing the instructions while the operational stages continue to process instructions,
   the means for directly returning the aborted instructions further including a mechanism coupled to a stage of the plurality of stages the mechanism being directly connected to the at least one issue stage for communicating the aborted instructions directly to the at least one instruction issue stage.

2. The pipeline control system as recited in claim 1, wherein the means for directly returning the issued instruction includes at least one registered buffer to account for wire delays associated with returning the aborted instructions.

3. The pipeline control system as recited in claim 1, wherein the means for analyzing includes instruction logic for determining if resources are available for processing the issued instruction.

4. The pipeline control system as recited in claim 1, wherein means for analyzing an issued instruction to determine if the issued instruction is to be aborted and reissued includes instruction logic for determining if an exception condition has been raised for the issued instruction.

5. The pipeline control system as recited in claim 4, wherein the at least one instruction issue stage includes a prefetch unit which prefetches an exception handler for handling the exception condition.

6. The pipeline control system as recited in claim 1, wherein the pipeline control system is implemented for in-order processors.

7. The pipeline control system as recited in claim 6, further comprising a mechanism to enforce in-order behavior, the mechanism to enforce in-order behavior being coupled to one of the operational stages to annul and abort instructions after a first aborted instruction is encountered until the first aborted is successfully completed.

8. The pipeline control system as recited in claim 7, wherein the mechanism to enforce in-order behavior includes a logic circuit for blocking and unblocking machine state altering operations to maintain in-order processing, the logic circuit being coupled to at least one of the plurality of operation stages.

9. The pipeline control system as recited in claim 8, wherein the logic circuit blocks operations when an exception is encountered for the issued instruction and unblocks operations when the instruction reissues successfully.

10. The pipeline control system as recited in claim 1, wherein the pipeline control system is implemented for out-of-order processors.

11. The pipeline control system as recited in claim 10, further comprising an instruction fetch unit for fetching instructions, the instruction fetch unit for prefetching other instructions to be sent to the at least one instruction issue stage while the aborted instructions are returned to the at least one instruction issue stage.

12. The pipeline control system as recited in claim 1, wherein the means for directly returning aborted instructions further comprises a program counter for receiving address information of the aborted instructions such that addresses of instructions of the aborted instructions are employed by the at least one instruction issue stage to reissue the aborted instruction.

13. A pipeline control system comprising:
 a plurality of operation stages for processing instructions, the operation stages including at least one instruction issue stage including buffers wherein instructions wait to be issued;
 means for issuing the instructions;
 means for analyzing the issued instructions to determine if resources are available to execute the issued instructions, if resources are not available, the issued instructions are to be aborted including means for marking the aborted instruction as a candidate for reissue; and
 means for directly returning the aborted instructions to the at least one instruction issue stage without communicating that instructions have been aborted to other stages of the plurality of operational stages such that the aborted instructions are reissued by the means for issuing the instructions while the operational stages continue to process instructions;
 the means for directly returning the aborted instructions further including a mechanism coupled to a stage of the plurality of stages, the mechanism is directly connected to the at least one issue stage for communicating the aborted instructions directly to the at least one instruction issue stage.

14. The pipeline control system as recited in claim 13, wherein aborted instructions are returned to the at least one instruction issue stage using at least one registered buffer to account for wire delays associated with returning the aborted instructions.

15. The pipeline control system as recited in claim 13, wherein the means for analyzing includes instruction logic for determining if resources are available for processing the issued instruction.

16. The pipeline control system as recited in claim 13, wherein means for analyzing includes instruction logic for determining if an exception condition has been raised for the issued instruction.

17. The pipeline control system as recited in claim 13, wherein the at least one instruction issue stage includes a prefetch unit which prefetches an exception handler for handling the exception condition.

18. The pipeline control system as recited in claim 13, wherein the pipeline control system is implemented for in-order processors.

19. The pipeline control system as recited in claim 18, further comprising a mechanism to enforce in-order behavior, the mechanism to enforce in-order behavior being coupled to one of the operational stages to annul and abort instructions after a first aborted instruction is encountered until the first aborted is successfully completed.

20. The pipeline control system as recited in claim 19 wherein the mechanism to enforce in-order behavior includes a logic circuit for blocking and unblocking machine state altering operations to maintain in-order processing, the logic circuit being coupled to at least one of the plurality of operation stages.

21. The pipeline control system as recited in claim 20, wherein the logic circuit blocks operations when an exception is encountered for the issued instruction and unblocks operations when the instruction reissues successfully.

22. The pipeline control system as recited in claim 13, wherein the pipeline control system is implemented for out-of-order processors.

23. The pipeline control system as recited in claim 22, further comprising an instruction fetch unit for fetching instructions, the instruction fetch unit for prefetching other instructions to be sent to the at least one instruction issue stare while the aborted instructions are returned to the at least one instruction issue stage.

24. The pipeline control system as recited in claim 13, wherein the means for directly returning aborted instructions further comprises a program counter for receiving address information of the aborted instructions such that addresses of instructions of the aborted instructions are employed by the at least one instruction issue stage to reissue the aborted instruction.

25. The pipeline control system as recited in claim 13, wherein the means for marking includes a data bit added to each reissue candidate.

26. A method for pipeline control for processors comprising the steps of:
 providing operation stages for processing instructions, the operation stages including at least one instruction issue stage including buffers wherein instructions wait to be issued;
 issuing instructions for execution;
 analyzing the issued instructions to determine if the issued instructions are to be aborted and reissued; and
 eliminating stall conditions by directly communicating the aborted instructions to the at least one instruction issue stage by directly returning the aborted instructions to be reissued to the at least one instruction issue stage without communicating that instructions have been aborted to other stages of the plurality of operational stages such that the instruction is reissued while the operational stages continue to process instructions.

27. The method as recited in claim 26, further comprising the steps of:
 determining if resources are available for processing the issued instruction; and
 aborting the issued instruction if resources are unavailable.

28. The method as recited in claim 26, further comprising the steps of:
 determining if an exception condition has been raised by the issued instruction;
 aborting the issued instruction, and
 executing an appropriate exception handler.

29. The method as recited in claim 28, further comprising the step of prefetching an exception handler for handling the exception condition.

30. The method as recited in claim 26, further comprising the step of blocking and unblocking state altering operations to maintain in-order processing.

31. The method as recited in claim 30, wherein the step of blocking operations is performed when an exception is encountered for the issued instruction and the unblocking operations is performed when the instruction reissues successfully.

32. The method as recited in claim 26, further comprises the step of marking the aborted instructions as reissue candidates.

33. The method as recited in claim 26, further comprises the step of:

returning an instruction identifier for an aborted instruction to the at least one instruction issue stage to identify the aborted instruction to be reissued.

34. The method as recited in claim 26, further comprising the steps of:

when instructions are aborted due to lack of resources, returning resource availability information to the aborted instruction sent back to the at least one instruction issue stage; and waiting the until the resources are available to reissue the aborted instructions.

35. The method as recited in claim 26, further comprises the step of marking the aborted instructions which have raised an exception.

36. A program storage device readable by machine, tangibly embodying a program of instructions executable by the machine to perform method steps for pipeline control for processors as recited in claim 26.

* * * * *